March 6, 1934.  W. T. CHARLES  1,949,859
UNIVERSAL COUPLING
Filed Nov. 12, 1932
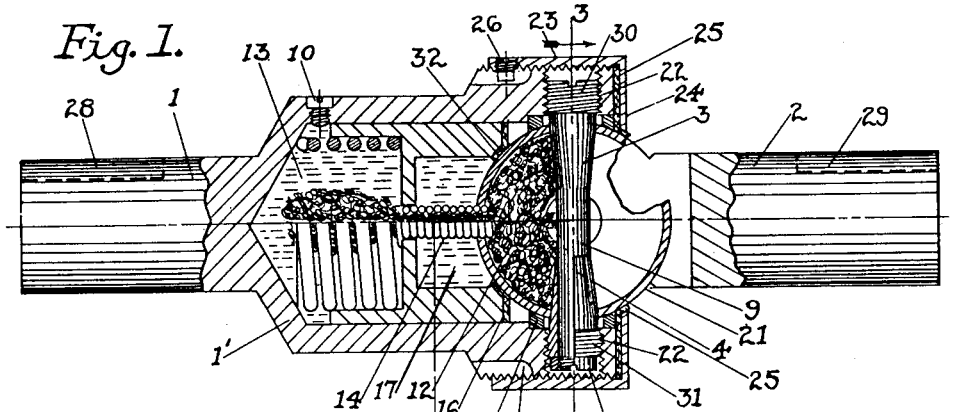
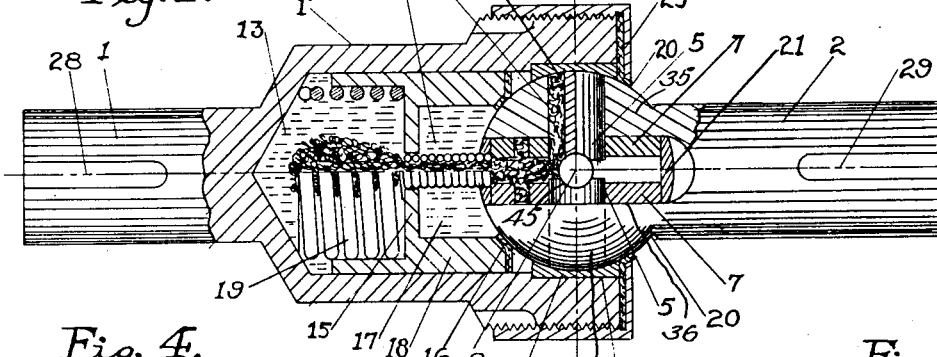
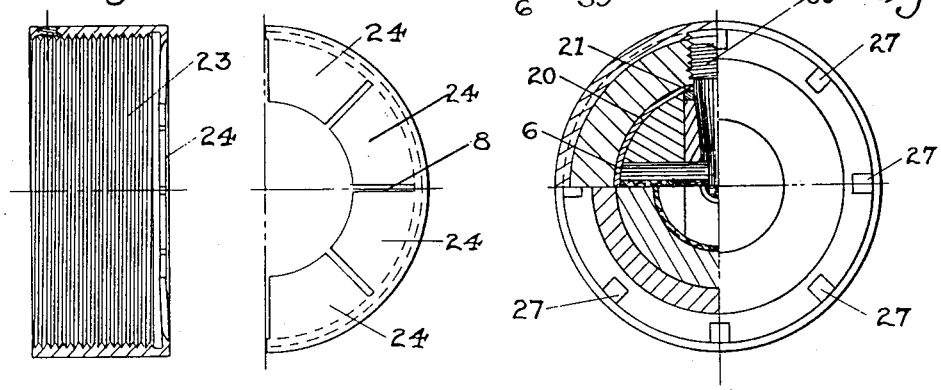
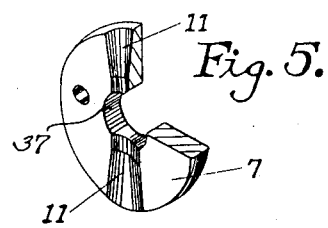
Inventor.
William Thomas Charles Patented Mar. 6, 1934

1,949,859

UNITED STATES PATENT OFFICE 1,949,859

UNIVERSAL COUPLING

William Thomas Charles, Washington, D. C.

Application November 12, 1932, Serial No. 642,429

7 Claims. (Cl. 64—91)

The present invention relates to universal couplings and the primary object of the invention is to provide an improved coupling wherein the oscillating members are comparatively small, thus reducing friction to a minimum and rendering the coupling adaptable for connecting high speed shafts.

A further object of the invention is to provide a universal coupling embodying adjustable means to compensate for wear and yet retain concentricity of parts.

A further object of the invention resides in the novel lubricating arrangement to overcome centrifugal force.

A still further object of the invention is to provide an improved universal coupling which may be used in any position without impairing its self-contained lubricating features.

Other objects and advantages of the invention will be apparent from the following detailed description, taken in connection with the accompanying drawing, forming a part of this specification, and in which drawing, Figure 1 is a longitudinal section through the improved coupling.

Figure 2 is a longitudinal section through the coupling at a right angle to the showing in Figure 1.

Figure 3 is a transverse section through a portion of the coupling substantially on the line 3—3 of Figure 1.

Figure 4 is a view in section and in end elevation of a protecting cap or shield.

Figure 5 is a perspective view partly broken away of the inner face of one of the disc members.

Referring to the drawing in detail and wherein like reference characters designate corresponding parts throughout the several views, the improved coupling comprises a pair of coupling members 1 and 2 respectively provided with keyways 28 and 29 for suitable connection to shafts to be connected by the universal coupling. The member 1 may be termed the socket coupling member, while the member 2 may be termed the ball coupling member.

The coupling member 1 is provided with a tubular body portion 1' opening at the end of the member and being closed at its inner end.

The coupling member 2 is formed at its end with two spaced apart spherical segmental portions 35 having parallel confronting surfaces 36. The spherical end formation of the coupling member 2 is adapted for positioning in the outer end of a hollow body portion 1' of the coupling member 1.

Arranged between the flat inner surfaces 36 of the ball portions 35 is a pair of discs 7 having plain outer faces contacting the surfaces 36. As will be seen in Figure 2 the combined thicknesses of the discs 7 is less than spacing between the ball portions 35. The discs 7 are each provided with an axially disposed circular opening 37 and at their inner or confronting faces are provided with substantially semi-circular recesses 11 which flare toward the periphery of the discs. Each of the ball portions 35 are provided with a circular opening 39 of a diameter preferably equal to the diameter of the openings 37 in the discs 7.

The openings 37 align and are adapted to receive pivot pins 5—5 having convex outer ends conforming to the spherical surfaces 20 of the ball portions 35. The inner ends of the pins 5—5 are provided with semi-circular recesses 45 as clearly shown in Figure 2.

Encircling the discs 7 is a contour ring 21 having a spherical outer surface conforming to the spherical surfaces 20 so that the outer surface of the ring 21 co-acts with the surfaces 20 to provide a ball or spherical end for the coupling member 2.

The tubular body portion 1' is provided adjacent its outer end with diametrically disposed threaded openings 22—22. Threaded into one of the openings 22 is a pivot pin 9 having a threaded end portion 30 engaging in the threaded opening. Inwardly of the threaded portion 30, the pivot pin 9 is formed with a tapering portion 3 for engaging two of the confronting recesses 11 in the discs 7. Threaded into the opposite threaded opening 22 as by its threaded portion 31 is a tapering sleeve 4 for engaging between two of the recesses 11 in the discs 7. The center portion of the pivot pin 9 is rotatable in the recesses 45 provided at the inner ends of the pivot pins 5 and as will be observed, the pivot pin 9 extends at right angles to the pivot pins 5. The pin portion 3 and the tapering sleeve 4 extend thru the contour ring 21. Thus it will be seen that threading of the pin 9 and sleeve 4 act to spread the discs 7—7 against the confronting surfaces 36 of the ball portions 35.

Arranged in the outer end of the body portion 1' is a two-piece socket ring 6 for engaging the spherical surface of the ball portions and as will be observed in Figure 2, this socket ring 6 retains the pivot pins against outward movement. Thus it will be seen that the coupling members 1 and 2 are permitted to assume an angular relation and pivot upon the pins 5 and member 9. This socket ring 6 while contacting the ball end of the member 2 does not form an actual working surface for the coupling. The oscillating surfaces for the coupling are upon those portions of the pins 5 where they extend through the ball portions 35, and upon the tapering portion 3 of the pin 9 and the tapering sleeve 4 where they contact the semi-circular recesses in the discs 7.

The open end of the body portion 1' is externally threaded for reception of a protecting cap or shield 23 having an inturned flange at one end slotted as at 8 to provide yieldable portions 24 which are normally inwardly inclined as shown in Figure 4. A gasket 25 is retained by these yieldable portions 24 in intimate contact with the ball end of the coupling member 2. The body portion 1' is provided with external grooves or slots 27 for receiving a screw 26 threaded thru the cap 23 whereby the cap is held in adjusted position against rotation.

As will be observed the pin 9 and sleeve 4 may be independently adjusted and through their action spread the discs 7 against the confronting surfaces of the portions 35. When adjusted, the adjustments may be retained by means of a lock nut 33 threaded upon the end of the pin 9.

Referring now to the form of lubricating means for the joint, the tubular sleeve 18 is disposed in the tubular portion 1' at the rear of the ball end of the member 2 and this sleeve is provided intermediate its ends with a partition wall 15 providing a lubricant chamber or reservoir 13 at the rear of the wall. This partition wall 15 also provides a chamber 17. The forward end of the sleeve 18 is dished to provide a surface upon which is provided a gasket 16 for engaging upon the spherical surface formed by the contour ring 21 and surfaces 20. An expansion coil spring 19 acting upon the partition wall 15 acts to normally urge the sleeve 18 outwardly and the gasket 16 into engagement with the spherical surfaces.

Lubricant is fed to the oscillating parts by means of a wick 12 leading from the lubricant chamber 13 through a flexible spring 14 and terminating adjacent the bearing surfaces of the parts to be lubricated. The spring 14 extends axially through the wall 15 and into the contour ring whereby the wick may extend between the discs 7 and to other portions of the coupling to be lubricated. The lubricant chamber 13 may be refilled by removing the screw 10 from its threaded reception in the wall of the body portion 1'.

The lubricant chamber 13 provides for the proper retention of lubricant under all conditions and the wall 15 prevents passage of lubricant into the chamber 17 where centrifugal action of the lubricant would have to be overcome by the gasket 16. The yielding action of the spring 14 may result in some lubricant escaping into the chamber 17 and be subjected to a centrifugal action. However, this small escape of oil will not become a serious matter since the gasket 16 is always held against the spherical surface at the ball end by the spring 19. It will therefore be seen that by retaining the main body of lubricant in a substantially closed chamber that centrifugal action has no effect upon throwing the oil outwardly of the coupling when rotating at relatively high speeds. It will also be seen that the lubricating arrangement permits placing of the coupling device in any position without loss of lubricant through centrifugal action.

Changes in detail may be made to the form of invention herein shown and described, without departing from the spirit of the invention or the scope of the following claims.

I claim:

1. In a universal coupling, a coupling member having a terminally opening socket, a terminally slotted member providing spaced apart end portions extending into the socket and having their flat faces in parallel confronting relation, a pair of disc members engaging upon said faces, each having oppositely tapered recesses in one face of the disc aligning diametrically of the disc and an axial opening, a pivot pin extending diametrically between the disc members and having one end threaded in the coupling member, a tapered portion on the pin at the threaded end thereof engaging two confronting tapered recesses in the discs, a tapered sleeve rotatable on the opposite end of the pivot pin for engaging the other two confronting tapered recesses and having threaded connection with the coupling member, and a pair of pivot studs extending one through each of said end portions in right angular relation to the pivot pin and having their inner ends extending through the axial openings in the disc members in contact with said pivot pin.

2. In a universal coupling, a socket coupling member having a terminally opening socket, a ball coupling member having a slotted end providing spaced apart end portions having parallel confronting surfaces, a pair of disc members disposed between the end portions and engaging upon said confronting surfaces, said disc members having companion pairs of tapering recesses arranged diametrically in their confronting faces, a pivot pin secured at one end in the socket coupling member and having a tapered portion engaging in one pair of said recesses, a tapered sleeve on the pin and engaging in the other pair of recesses, and a pivot member in each of said end portions at a right angle to said pivot pin and having their inner ends projecting axially into said disc members.

3. In a universal coupling, a socket coupling member having a terminally opening socket, a ball coupling member having a slotted end providing spaced apart semispherical end portions, a pair of disc members disposed between said end portions and having companion pairs of diametrically arranged tapering recesses in their confronting faces, a pivot pin threaded at one end in the socket coupling member and extending diametrically between the disc members and having a tapered portion engaging between one pair of tapering recesses, a tapering sleeve on the pivot pin and threaded in the socket coupling member for engaging between the companion pair of tapering recesses, said tapered portion and tapering sleeve acting to spread said disc members apart, locking means for the pin and sleeve, and a pair of axially aligning pivot studs held against rotation thru interfitting engagement at their adjacent ends with the pivot pin and upon which said semispherical end portions are pivoted.

4. In a universal coupling, a coupling member having a terminally opening socket, a ball member having spaced apart semi-spherical end portions extending through the socket with their flat faces in confronting relation, a pair of discs between the end portions, a contour ring encircling the discs and having its outer surface conforming to the spherical surface of the end portions, a pivot member secured at its ends in the coupling member and extending diametrically through the contour ring between the disc members, co-acting wedge means between the pivot member and discs for urging the discs into contact with the flat surfaces of the end portions, and a pivot stud in each end portion axially of said disc members and upon which said end portions are adapted to pivot.

5. In a universal coupling, a coupling member having a tubular body portion, a ball member provided with a spherical end portion having a universal connection in the outer end of the tubular body portion, a sleeve slidably fitting in the tubular body portion behind said spherical end portion and having a transverse partition wall intermediate its ends providing a lubricant chamber at the inner end of the tubular body portion, spring means normally urging the forward end of the sleeve into bearing contact with said spherical end portion, a hollow flexible member connected between said partition and spherical end portion axially of the sleeve, and a wick in said flexible member for conducting lubricant from said chamber to active bearing surfaces of the coupling.

6. In a universal coupling, a coupling member having a tubular body portion, a ball member having spaced apart semi-spherical end portions extending into the body portion, disc members disposed between the flat faces of the end portions, a contour ring encircling the discs and conforming to the surface of the end portions, a pivot pin secured at its ends in the coupling member and extending between the disc members, a pivot member extending diametrically through each of said end portions at a right angle to the pivot pin and having interlocking engagement at their inner ends with the pivot pin, a sleeve slidable in the tubular body portion and having a transverse partition intermediate its ends providing a lubricant chamber spaced from the ball member, spring means normally urging the sleeve into engagement with the spherical surfaces of the end portions and said contour ring, a sealing gasket between the sleeve and spherical surfaces, a flexible conduit connected between the partition and contour ring axially of the partition, and a wick in said conduit for conducting lubricant from the lubricant chamber for lubricating active parts of the coupling.

7. In a universal coupling, a coupling member having a tubular body portion, a ball member having a universal connection in the outer end of the tubular body portion of a construction providing a spherical head, a sleeve slidable in the tubular body portion and having a transverse partition intermediate its ends providing a lubricant chamber at the rear of the partition, spring means normally urging the sleeve forwardly, a gasket at the forward end of the sleeve for engaging said spherical surface, a flexible member axially of the sleeve connecting the lubricating chamber with the spherical end of the ball member, and a wick in said member.

WILLIAM THOMAS CHARLES.